United States Patent [19]

Wilkie

[11] Patent Number: 4,686,699
[45] Date of Patent: Aug. 11, 1987

[54] CALL PROGRESS MONITOR FOR A COMPUTER TELEPHONE INTERFACE

[75] Inventor: Bruce J. Wilkie, Ijamsville, Md.

[73] Assignee: International Business Machines Corporation, Armonk, N.Y.

[21] Appl. No.: 684,826

[22] Filed: Dec. 21, 1984

[51] Int. Cl.$^4$ ............................................. H04M 11/06
[52] U.S. Cl. ........................................ 379/93; 379/40; 379/46; 379/97; 379/386
[58] Field of Search ............... 179/2 DP, 84 DF; 379/93, 97, 98, 40, 46, 51, 386

[56] References Cited

U.S. PATENT DOCUMENTS

| | | | |
|---|---|---|---|
| 4,028,493 | 6/1977 | Brennemann et al. | 179/2 DP |
| 4,084,245 | 4/1978 | Bunge | 364/485 |
| 4,133,979 | 1/1979 | Helliwell | 179/84 VF X |
| 4,151,472 | 4/1979 | Watanabe et al. | |
| 4,151,474 | 4/1979 | Woollvin et al. | |
| 4,227,055 | 10/1980 | Hanson | |
| 4,254,304 | 3/1981 | Fulghum et al. | 179/2 DP |
| 4,313,038 | 1/1982 | Nilssen et al. | |
| 4,353,044 | 10/1982 | Nossek | |
| 4,383,228 | 5/1983 | Gaillard | |
| 4,421,952 | 12/1983 | Barnes | |
| 4,502,049 | 2/1985 | Atkinson | 379/386 X |
| 4,549,044 | 10/1985 | Durham | 379/40 |
| 4,578,537 | 3/1986 | Faggin et al. | 179/2 DP |

OTHER PUBLICATIONS

B. J. White, et al., "A Monolithic Dual Tone Multifrequency Receiver", 12/79, *IEEE Journal of Solid-State Circuits*, pp. 991-997.
G. M. Jacobs, et al., "Touch-Tone Decoder Chip Mates Analog Filters with Digital Logic", *Electronics*, pp. 105-112.

*Primary Examiner*—Gene Z. Rubinson
*Assistant Examiner*—Matthew E. Connors
*Attorney, Agent, or Firm*—John E. Hoel; George R. Pettit

[57] ABSTRACT

A call progress monitor for a computer telephone interface system. Energy detectors are connected to receive signals from a telephone line. A bandpass filter is connected to the telephone line, having selectable center frequency. A counter-timer connected to count clock pulses is reset by the energy detector and timing commences in response to the presence of a signal on the telephone line. The counter will result in a center frequency control means for the filter being slewed over a bandwidth of interest, in synchronism with the counting of the timer-counter. A signal detector connected to the filter indicates the presence of a pair of signal tones passing through the filter as it is slewed. Decoding means are connected to the counter-timer and the signal detector for generating a binary signal indicating the frequency of the bandpass filter which passes each signal tone. The binary signal is entered in a data register, and an interrupt posted to a host computer. During the remaining portion of a counting cycle, a cadence interval is detected and the data register is loaded with cadence data. An interrupt is posted at the end of the cadence measuring interval for signalling the computer to read the contents of the data register.

13 Claims, 4 Drawing Figures

CALL PROGRESS MONITOR FOR A COMPUTER TELEPHONE INTERFACE

The present invention relates to the communicating computer art. Specifically, a call progress monitor is provided for determining signal activity on a telephone line, and providing the identity of that activity to a connected computer.

Communicating by computer over standard telephone lines requires an ability to reliably determine the condition of the telephone line before initiating transmission. The telephone line may at any time prior to transmission exhibit any one of several conditions including a busy signal, ringing signal and a dial tone signal. Additionally, the telephone line may exhibit a fault condition where no signal energy may be present on the line. Except for the condition of the dial tone signal, seizing the telephone line and communicating by computer under these conditions will not be possible.

Prior art communicating computer systems utilize a call progress monitor to determine these line conditions. Additionally, circuitry is required to identify answer back tones which may be present on the telephone line identifying the transmission format of a called modem.

Call progress monitoring has typically been accomplished through cadence timing. Cadence timing senses the presence of signal energy on the line, and measures the duration of that signal energy to determine the line condition. Cadence timing, however, is subject to some disadvantages. Included among these disadvantages is a minimum time of a ½ second to check cadence timing, and an error rate which may, because of a high noise condition on the telephone line, exceed 40 to 50%.

SUMMARY OF THE INVENTION

It is an object of this invention to provide call progress monitoring for a communicating computer.

It is a more specific object of this invention to provide for call progress monitoring of a telephone line with improved reliability.

These and other objects are accomplished by a call progress monitor in accordance with the invention. The monitoring of telephone signal conditions is accomplished with apparatus which measures the frequency of signals on the telephone line, as well as the cadence of said signals. The frequency measurement is accomplished by initiating scanning of a bandpass filter upon detection of signal energy on the line. The bandpass filter center frequency will be shifted over a frequency bandwidth which includes the frequencies of the usual signals on the line.

Additional to frequency measurement of telephone line signal conditions, cadence timing of the signals is also provided. The cadence timing is initiated with the detection of signal energy on the line.

In a preferred embodiment of the invention, a counter is enabled by the communicating computer to count clock pulses. Upon the indication of signal energy on the line the counter is reset. The counter, during a first portion of its counting cycle after being reset, effects frequency slewing of a bandpass filter. Energy from the filter is detected during slewing, thus identifying the signal frequencies on the telephone line. Cadence timing is effected by decoding the output of the counter during a subsequent portion of the counting interval when the signal line energy is interrupted.

The identified signal frequencies of the detected signal energy is loaded into a register. An interrupt posted at the end of the first portion of the counting cycle will result in the communicating computer reading the register, whereby the signal conditions on the telephone line are determined.

Following loading of the frequency data, the cadence timing is loaded in the register. Another interrupt is posted, permitting the cadence data to be read by the computer.

In the event of a DEAD LINE condition, the counter is never reset and will eventually reach a maximum count. This condition is detected and data is loaded in the register, indicting a DEAD LINE condition. DIAL TONE, which has no cadence, is determined by detecting only one reset of the interval timer which occurs within a prescribed time interval. Data indicating DIAL TONE is then loaded in the register. Subsequent interrupts will be initiated to permit either the DIALTONE or DEAD LINE condition to be read by the computer.

The preferred embodiment also permits ANSWERTONE analysis. A mode command from the computer will inhibit cadence timing and select an ANSWERTONE frequency bandwidth over which the filter is slewed. The frequency of detected signal energy lying within the slewed bandwidth will be decoded and stored in the register. An IRQ command issued after slewing will result in the computer reading the register contents identifying the frequency of a received ANSWERTONE.

DESCRIPTION OF PREFERRED EMBODIMENT

Figure 1:
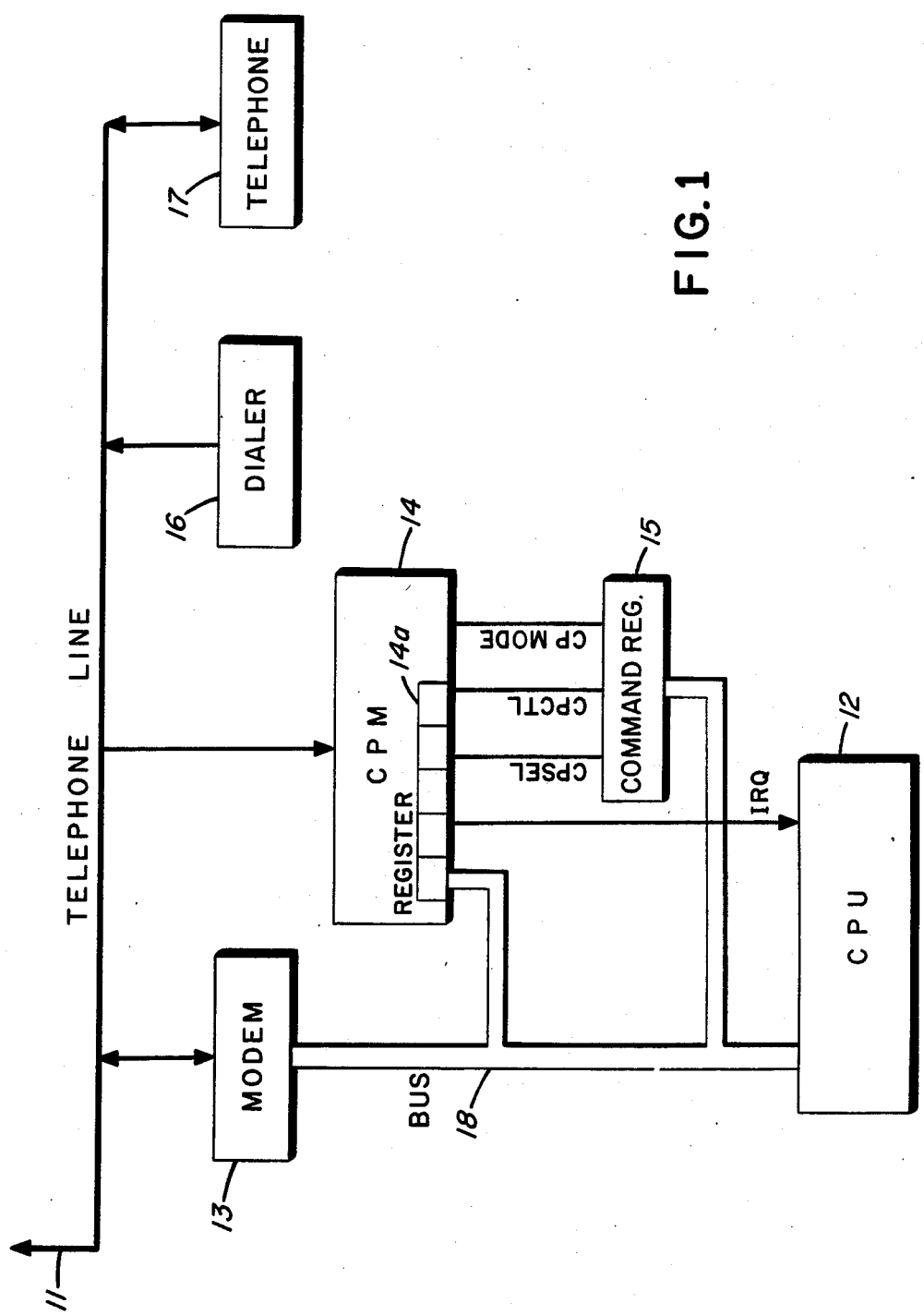
FIG. 1 is an overall block diagram of a communicating computer terminal.

Referring now to FIG. 1, there is generally shown a block diagram of a communicating computer system. A computer, identified as CPU 12, is connected via a modem 13 to a telephone line 11. In addition to the CPU is a telephone 17 which permits the communicating computer facility to use both voice communication as well as data communication. Further, the dialer 16 will initiate contact with a called party.

A call progress monitor 14 is shown in FIG. 1 which will monitor conditions on the telephone line 11. Prior to connecting the CPU 12 to the telephone line, it is required to determine whether or not the line is not otherwise occupied and unavailable for service. The conditions on the telephone line 11 which preclude use include a dead line (non-functioning telephone line), a busy signal, or a ringing signal. Additional to these conditions is a standard dial tone condition which must be determined to exist on the telephone line 11 before connecting the CPU 12 to telephone line 11.

Additional to determining the line conditions under normal telephone communication usage, the CPM 14 is configured to detect ANSWERBACK tones when CPU 12 has obtained access to telephone line 11.

The call progress monitor, CPM 14, is operated under control of a command register 15. Command register 15 will apply three (3) control signals to the CPM 14 comprising CP MODE, CPCTL and CPSEL. The CPM 14 puts out an interrupt signal, IRQ, when one of the telephone line signal conditions have been detected on the telephone line 11. The IRQ signal is routed to the CPU 12 to indicate one or more condition has been detected.

The CP MODE line will, in response to a command from the CPU 12, establish the CPM 14 in the ANSWER TONE detect mode or in the CALL PROGRESS MODE. As such, the CPM 14 will be enabled to detect energy appearing on the telephone line 11, and determine the frequency and cadence of the energy which lies between 350 Hz. and 620 Hz. for a call progress monitor mode, and the frequency of signals between 2 and 2.4 kHz. in an ANSWERTONE mode.

The CPCTL line is an enable line to the call progress monitor 14 which will enable the call progress monitor 14 when the CPU 12 calls for the monitoring function.

When the CPM 14 is operable in the call progress mode, frequency scanning commences upon the detection of any energy on telephone line 11. The frequency scanning will occur between 350 Hz. and 620 Hz. in four (4) discrete frequency bands. A detection of energy in any one of the discrete energy bands will be identified and loaded in a register 14a internal to CPM 14. The normal telephone line energy is comprised of a pair of signal tones of different frequencies which lie in different frequency bands. At the same time such energy is detected, an interrupt command, IRQ, is issued to the CPU 12. CPU 12 will then address the command register 15 and hold the CPSEL line in a logic 1 state. The CPSEL control line in the logic 1 state will dump the contents of the CPM 14 register 14a onto the bus 18 where it can be routed to the CPU 12. Thus, during frequency scanning in the CPM mode, the telephone line 11 energy is sampled at these four (4) frequencies of interest, and the output register of CPM 14 records the frequencies of a pair of detected signal tones. The register then dumps its contents in response to the CPSEL command for the CPU 12 to identify the telephone line activity.

Additional to the frequency scanning and detection of CPM 14, CPM 14 provides for cadence timing of the detected telephone line signal energy. Following the frequency scanning function, the register 14a of CPM 14 will be loaded with data which indicates the cadence of energy detected on the telephone line 11. At the time of cadence detection, another IRQ signal will be initiated, whereby CPU 12 may call for the contents of the CPM register 14a, thus, identifying the cadence of telephone line 11 energy.

Associated with the detection of the cadence for signal energy detected on telephone line 11, the register of CPM 14 will indicate the presence of a dead line, i.e., where no energy is detected, indicating the absence of dial tone. This condition as well, once loaded in the output register 14a of CPM 14, will initiate an interrupt and be read into the CPU 12.

The command register 15 will, in response to the command initiated by CPU 12, change the mode from a call progress mode to an ANSWERTONE mode. With the call progress mode set to 1, and the CPCTL set to 1, no cadence timing is provided by the CPM 14. CPM 14 will, however, frequency scan over an ANSWERTONE bandwidth any detected energy on telephone line 11. The detection of energy on telephone line 11 will initiate an IRQ. The IRQ will, in the ANSWERTONE mode, result in CPU 12 raising, through command register 15, the CPSEL line to a logic 0 state, thus reading out the contents of CPM register 14a. CPM register 14a will have been loaded with data identifying any detected energy lying within one of the discrete frequency bands between 2 and 2.4 kHz. This frequency band is likewise divided into four (4) bandwidths, the four (4) bandwidths indicating an ANSWERTONE. Thus, the CPM register 14a of CPM 14 will deliver data identifying the bandwidth between 2 and 2.4 kHz containing the detected energy.

Figure 2:
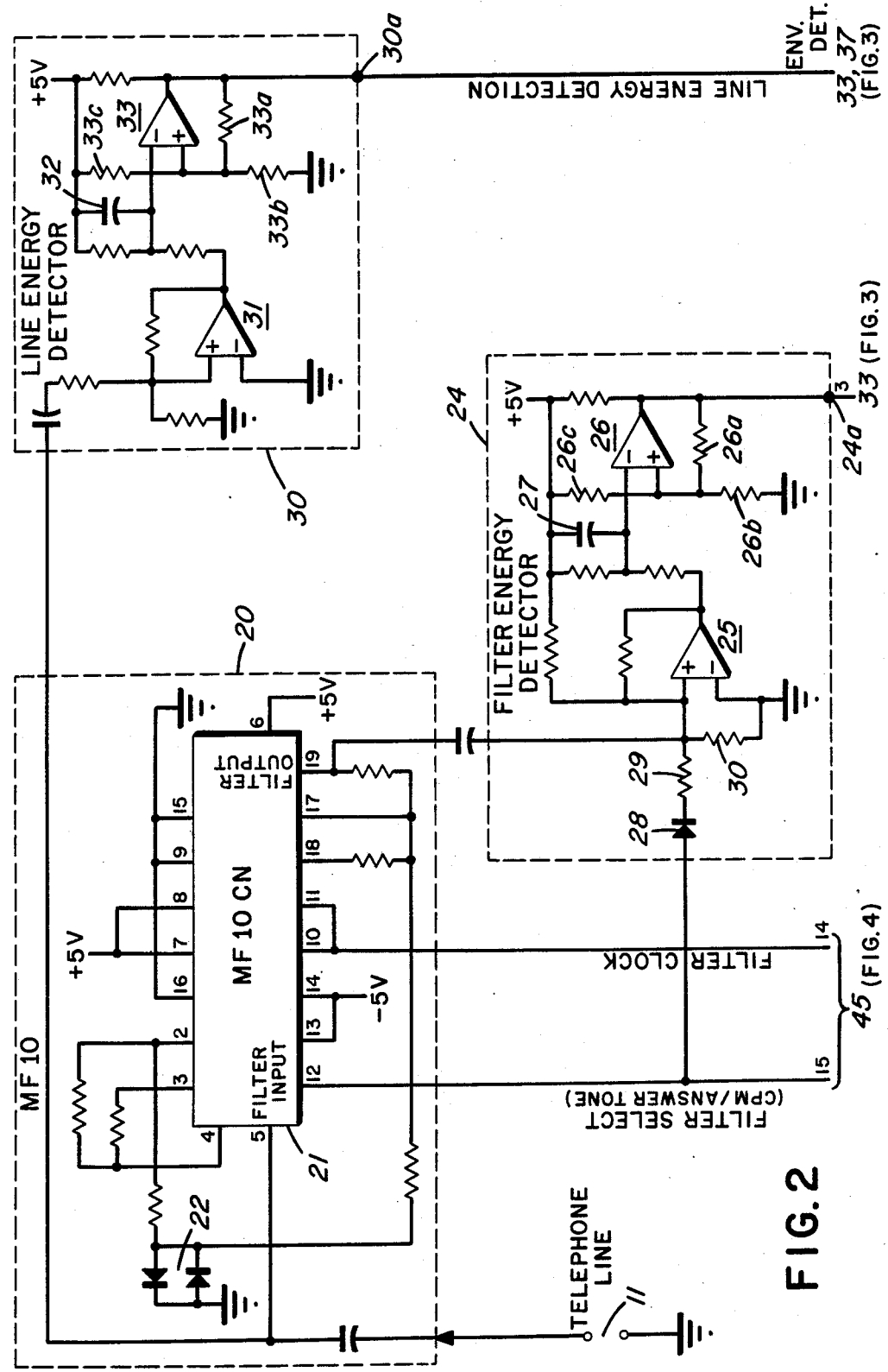
FIG. 2 is a schematic drawing of a filter, filter detector and energy detector for the call progress monitor.
Figure 3:
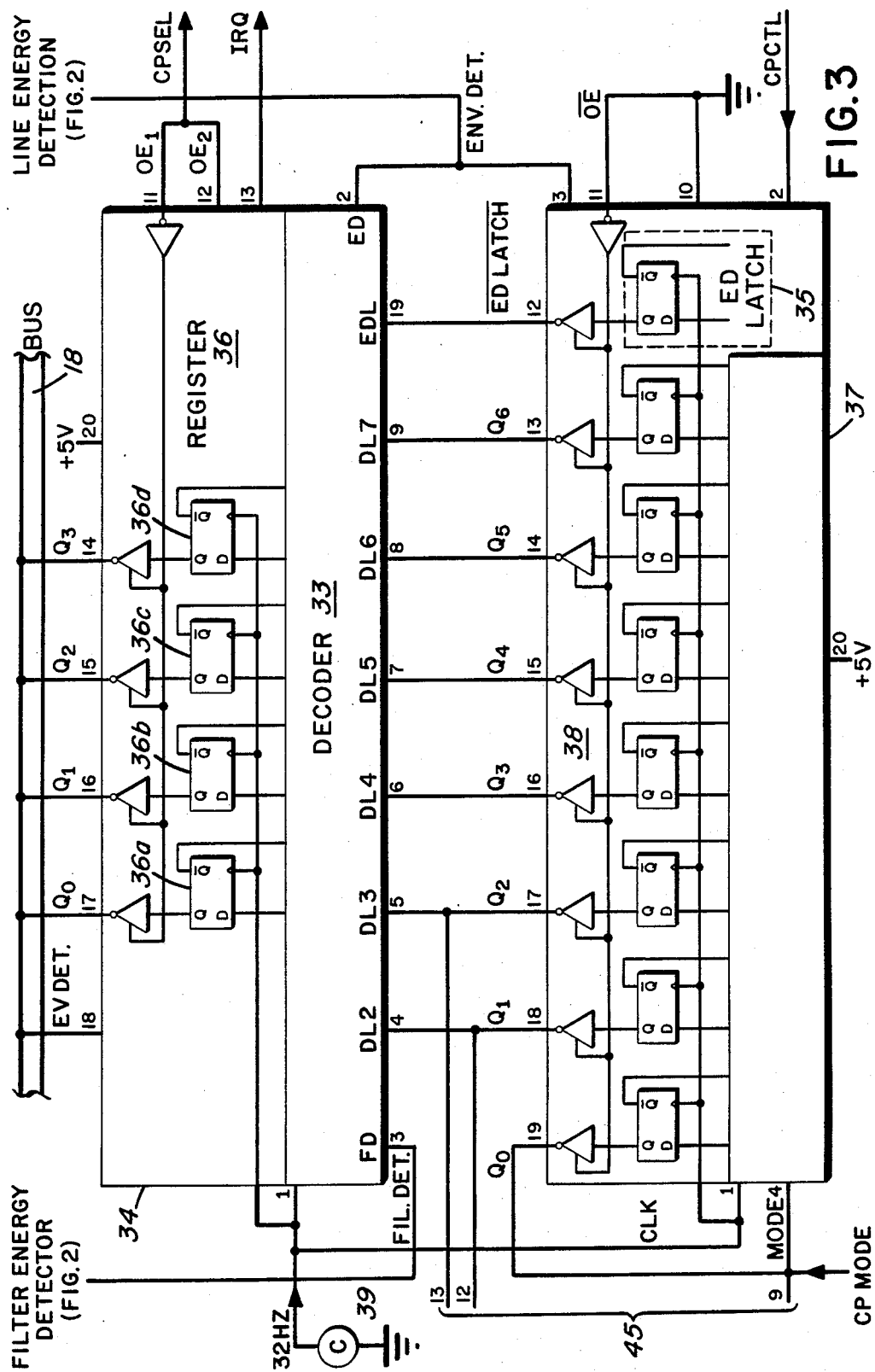
FIG. 3 is a schematic diagram of the processor and timing circuit of the call progress monitor.
Figure 4:
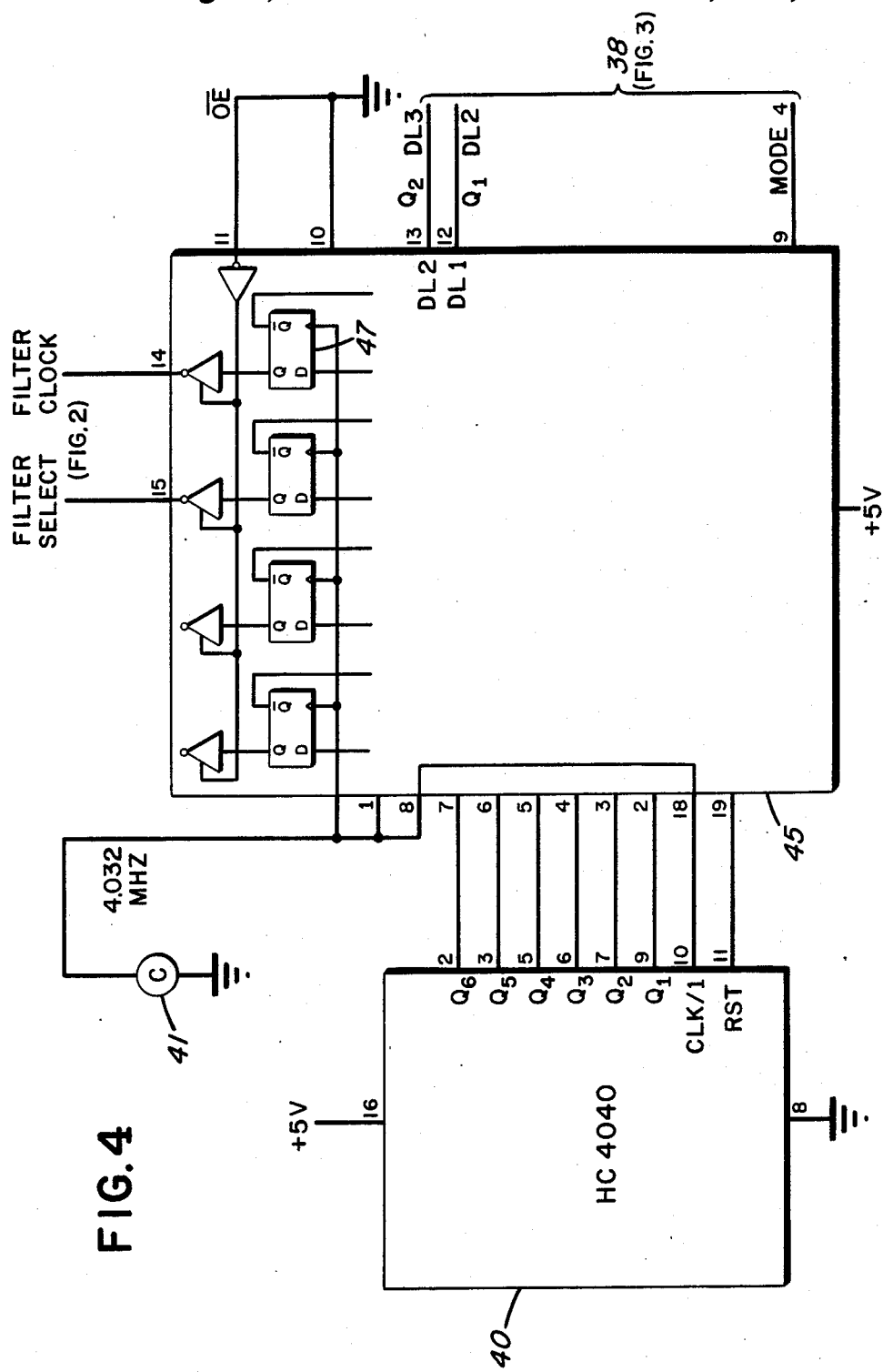
FIG. 4 is a schematic diagram of the filter frequency control circuit of FIG. 2.

The CPM 14, which is the subject of the present invention, is shown in one embodiment in FIGS. 2, 3 and 4. Referring to FIG. 2, there is shown a programmable bandpass filter structure 20. The programmable bandpass filter structure 20 receives energy from the telephone line 11. The programmable bandpass filter sttructure 20 is implemented from a switched capacitor filter 21, such as the National Semiconductor MS 10 Universal Monolithic Dual Switch Capacitor Filter. Referring to the National Semiconductor application notes of this device, it is clear that a clock input signal applied to terminal 10 thereof will control the center frequency of the bandpass filter structure. Additional frequency control is provided by a filter select signal which will permit frequency scanning of two separate bandwidths of interest, the ANSWERTONE bandwidth and CPM monitor bandwidth. Power supply connections of +5 volts and a common connection as well as a −5 volt connection are also provided to the device.

The bandpass filter structure includes first and second filter sections. The first bandpass filter section has a nominal Q of 10 and a gain of 20 DB. The gain of 20 DB and Q of 10 provide an output level of the first section within the maximum voltage swing of the output amplifier of the switched capacitor filter 21. The second section of MF 10 device includes a limiter circuit 22 which normalizes the output. The gain of the second section is set at 0.22. The resultant output of the two filter sections and the soft limiter provide the necessary tone separation over a 30 DB dynamic input range.

In the CPM mode, the filter 20 provides frequency selection for the following center frequencies depending on the applied clock frequency.

| Center Frequency |
| --- |
| 347.58 Hz |
| 438.26 Hz |
| 480.00 Hz |
| 620.00 Hz. |

In the ANSWERTONE mode, a control signal is applied to the filter select line of filter 20 which will provide one of the following center frequencies for filter 20, depending on the frequency of the filter clock signal frequency.

|  | Center Frequency |
| --- | --- |
| ANSWERTONES | 2016 Hz |
|  | 2122 Hz |
|  | 2240 Hz |
|  | 2371 Hz |

The filter output signal is applied to the input of a filter energy detector 24. The filter energy detector 24 comprises a first comparator stage 25 connected as a zero crossing detector. A capacitor 27 is charged to a level corresponding to the state of comparator stage 25. Comparator 26 is connected to provide a comparison between a signal proportional to the average energy stored on capacitor 27, and a reference voltage established by resistors 26a, 26b and 26c. Control over the reference threshold for comparator 25 of filter energy detector 24 is provided through diode 28 and resistor 29. During the ANSWERTONE mode, resistor 29 is shunted across resistor 30 to alter the reference threshold of comparator 25 in the ANSWERTONE mode. Whenever the signal energy exceeds the reference voltage, a logic 1 level is provided on output terminal 24a.

The overall line energy detector 30 of FIG. 2 is also connected to the telephone line 11. Energy detector 30 is similar to the filter energy detector 24 comprised of the first amplifier 31 which establishes a charge on capacitor 32 proportional to the sensed line energy on telephone line 11. Comparator 33, has a reference voltage established by resistors 33a, 33b and 33c, which will indicate the presence of signal energy on telephone line 11, independent of the frequency of the telephone line 11 signal energy, by establishing a logic 1 signal level on the energy detect output line 30a.

Thus, the operation of the circuitry of FIG. 2 is seen to comprise (1) an indication of the presence of any electrical energy on the telephone line 11, and a frequency scanning of the energy appearing on telephone line 11 to detect a pair of tones, such that a busy signal, dial tone, fast busy and ringing signals are detected. In the ANSWERBACK mode, filter 20 will sample the energy appearing on telephone line 11 and identify any of four (4) answer tone signal frequencies which may be present.

Turning now to FIG. 3, there is shown an output register 36 which will store an indication of the frequencies of signals detected by the filter energy detector. Register 36 is part of a programmable logic array, PLA, which includes a decoder 33 to receive the filter energy detector output 24a, as well as the output logic level from line energy detector 30.

The programmable logic array 34 of FIG. 3 receives as an input the filter detector output logic level, as well as the line energy detector 30 output logic level. Additionally, the timer circuit 38 provides for address signals Q1-Q6 to PLA 34 indicative of the center frequency of bandpass filter 20. Thus, as the filter 20 is scanning in response to a clock signal, synchronized with timer 38 in a manner to be explained, decoder 33 will decode timer outputs Q1-Q6 when the filter detector output logic level is 1. This decoding will load register 36 with the following data format, depending on which pair of center frequencies produces a logic 1 output from filter detector 24.

| TONE FREQUENCIES | REGISTER 36 | | | | |
|---|---|---|---|---|---|
| | Q0 | Q1 | Q2 | Q3 | |
| 350,440 | 0 | 0 | 1 | 1 | DIAL TONE |
| 440,480 | 1 | 0 | 0 | 1 | RING BACK |
| 480,620 | 1 | 1 | 0 | 0 | BUSY & FAST BUSY |

The registers 36a, 36b, 36c and 36d are included in the programmable logic array 34. The array is programmed such that the register will assume the above configuration in response to detected filter energy, and the state of timer 38 at the time of filter energy detection.

After the registers 36a, 36b, 36c and 36d are loaded, an IRQ command is initiated 250 ms after the first detection of energy as indicated by the $\overline{\text{ED LATCH}}$ 35 contained in PLA 37. Upon receipt of the IRQ signal, the computer of FIG. 1 will initiate an CPSEL command, which is decoded in the command register 15. The CPSEL signal, when low, will apply the contents of registers 36a, 36b, 36c and 36d to the 8 bit parallel bus 18.

Timer 38 is enabled in response to the CPTL signal from command register 15 and controls both frequency slewing and cadence timing. CPTL signal is applied upon command of the CPU 12 to initiate the call progress monitoring function. Timer 38 counts 32 Hz clock pulses from clock 39 to provide a time indication relative to the first indication of energy on the line via outputs Q1 through Q6. The first energy detection observed, at the leading edge thereof, sets the output of a latch, denoted $\overline{\text{ED LATCH}}$ 35, contained in PLA 37 and resets timer 38 to begin timing again. PLA 34 decodes the $\overline{\text{ED LATCH}}$ indication and applies it to one of the eight lines of bus 18 when a CPSEL command is applied. Additionally, PLA 37 decodes the $\overline{\text{ED LATCH}}$, and outputs Q1 through Q6 to generate the IRQ at 250 ms after the first energy detection. This IRQ signals the computer that signal frequency slewing is complete, and data indicating the detected tone frequencies is available. At the conclusion of 250 milliseconds, after being reset by the line energy detector output signal, timer 38 continues to count clock pulses supplied by a 32 Hz. clock generator 39.

As noted, during the counting of the clock pulses, if energy is detected on the telephone line 11, the $\overline{\text{ED LATCH}}$ 35 internal to the PLA 37 containing timer 38 will be set and timer 38 will be reset to begin counting again. In the event that no energy is detected on the telephone line 11 as sensed by energy detector 30, timer 38 will continue counting without being reset for a full 3.18 to 3.78 seconds. The absence of energy detected at the EDL input of PLA 34 at this full count will be decoded as a DEAD LINE condition. Register 36 will have been loaded with the binary number 1111. The DEAD LINE condition will also generate, through the decoding of decoder 33, an IRQ command. The IRQ command will result in the CPU 12 generating a CPSEL signal which will dump the contents of register 36 on bus 18, indicating an inactive telephone line.

Assuming that energy detection has occurred on the telephone line 11 prior to the time out of 3.18 to 3.78 seconds of timer 38, the first reset of timer 38 occurs with the first leading edge of energy envelope detection. Timer 38 will be reset to count, $\overline{\text{ED LATCH}}$ will be in a logic 1 state, and at the following falling edge of energy, on the ED input of PLA 34, the count presented by timer 38 on lines Q1, Q2, Q4, Q5 and Q6 will be decoded. This count represents the cadence. Cadence at the following intervals will determine the line condition and the state of register 36:

| Cadence Time | | Line Signal Condition | Q0 | Q1 | Q2 | Q3 |
|---|---|---|---|---|---|---|
| 810 ms | 2.18 s | Ring | 1 | 0 | 0 | 1 |
| 2.18 s | 3.13 s | Dial Tone | 0 | 0 | 1 | 1 |
| 437 ms | 562 ms | Busy | 1 | 1 | 0 | 0 |

Thus, by appropriately decoding the timed cadence intervals represented by the output of timer 38 at the time of a falling edge of the signal from line energy detector 30 to the ED input of PLA 34, it is possible to load in register 36, at a time following the tone analysis which occurred during the first 250 milliseconds of timer 38's operation, the detected cadence information.

In the case of DIALTONE, which has no cadence, if the line energy detector 30 does not indicate a subsequent leading edge after 2.18 to 3.13 seconds of ED LATCH being set, decoder 33 will decode the counter output during this interval to provide data in output register stages 36a through 36d of 0011 and generate an IRQ signal.

The IRQ interrupt will also be sent to the CPU 12 upon a falling energy level detection by detector 30. CPU 12 will then read registers 36a through 36d by applying an CPSEL signal to the command register 15 of FIG. 1, which will decode it and apply the output signals of register stages 36a through 36d to the bus 18. Once the call progress monitor has completed its cycle of frequency analysis and cadence timing, subsequent falling signal levels will generate an IRQ signal when in the CALL PROGRESS mode. Thus, it is possible to monitor subsequent line activity by counting interrupts.

When a DEADLINE detection or DIALTONE detection is made by decoding the timer outputs of timer 38, and the state of $\overline{\text{ED LATCH}}$ 35 output, decoder 33 will also initiate an IRQ to permit register 36 to be read.

The timing circuitry for slewing filter 20 across both the CALL PROGRESS mode frequencies of interest, and the ANSWERTONE frequencies of interest, is shown more particularly in FIG. 3. Referring now to FIG. 3, there is shown a Motorola HC 4040 counter 40. A second clock 41 of 4.032 megacycles is applied through a decoder 45. Decoder 45 comprising a PLA, is programmable from $Q_2$, $Q_1$ from timer 38 applied to inputs DL1 and DL2. The DL1, DL2 inputs provide for one of four (4) decoding selections. For a selected decode number, counter 40 will be decoded, and a reset signal RST which is at a frequency for controlling filter 20, resets the counter 40. Thus, counter 40 is reset in accordance with the decode conditions received from timer 38. As such, timer 38 can, from Q1 and Q2, select a clock frequency for filter 20 having a duration of 62.5 ms. and a duty cycle which selects a center frequency for filter 20. Decoder 45 receives a mode input as well to select decoding for either receiving ANSWERTONEs or CALL PROGRESS mode signal tones. The reset signal used to reset counter 49 toggles a T flip-flop 47 within the decoder 45. The frequency of the T flipflop 47 represents a 50% duty cycle clock which drives the clock input of the filter 20. The Mode control input is decoded by decoder 45 to apply a logic 1 or 0 state to the FILTER SELECT control line of the filter 20. Additionally, the comparator threshold of filter energy detector 24 is modified when the mode control indicates that an ANSWERTONE frequency detection function is desired.

The CP mode control line will also inhibit counting of counter 38 after 250 ms in the ANSWERTONE mode. This is effected by decoding in PLA 37. Thus, once frequencies slewing is complete over the ANSWER TONE bandwidth, counter 38 stops counting.

SYSTEM DESCRIPTION

Having now described the call progress monitor in terms of specific hardware details for implementing both call progress monitoring and ANSWERTONE monitoring, the operation of the circuit in typical use will be explained.

During the ANSWERTONE mode, the CPMODE line is set to a logic 1 state prior to applying the CPCTL signal. This will inhibit a cadence interrupt from being issued through the decoding of PLA 37 which constitutes the timer 38. During the first 250 ms of pulse counting of counter 38, the filter 21 will be slewed over the ANSWERTONE frequency bandwidth. A single interrupt will be issued at the end of 250 ms to initiate reading of the contents of register 36 by CPU 12.

When the operator of CPU desires to initiate communication over telephone line 11, the call progress monitor function is initiated by CPU 11. This selected function is decoded by the command register 15 to indicate (1) that the CP mode is CALL PROGRESS mode rather than ANSWERTONE, and (2) that the timer is to be activated by holding the CPTL line in a logic 1 state.

When command register 15 indicates these conditions to the call progress monitor, timer 38 is enabled to start counting the 32 Hz. clock. Timer 38 will count clock pulses for a total of 3.187 seconds, unless restarted by the detection of a leading edge of signal energy on telephone line 11 by line energy detector 30.

When signal energy is detected on telephone line 11, the usual circumstance in a normal operating telephone line, counter 38 is restarted and the $\overline{\text{ED LATCH}}$ is set, indicating the receipt of a leading edge of an energy pulse from line energy detector 30. The timer 38 will continue to count for a period of 250 milliseconds before posting an interrupt. The IRQ, the interrupt indication, is detected by decoding Q1 through Q6 of output register 36 and the setting of the $\overline{\text{ED LATCH}}$. During the first 250 milliseconds, the Q1 and Q2 outputs of timer 38 have selected four (4) discreet tuning frequencies for filter 20. As will be recalled from the discussion of decoder 45 and counter 43, Q1 and Q2 outputs of timer 38 have selected a clock frequency for filter 20 for tuning the filter to each of the four frequencies of interest. During this first 250 milliseconds, wherein filter 20 is slewed over the bandwidth of interest, output register 36 will, under the control of timer 38, receive a filter signal detection indication for each tone detected and one of four, 4 bit codes will be entered into its four output register stages 36a through 36d. Thus, at the conclusion of the first 250 millisecond interval, after detecting signal energy, the identity of the frequency of each signal tone is available at output register 36. The IRQ signal will thus be initiated, and the contents of output register stages 36a–36d maintained for a total of 93 milliseconds. Upon receipt of an IRQ signal computer 12 will initiate a CPSEL command to dump the contents of register 36 onto bus 18.

With the tone information thus decoded, and presented to the bus 18 for analysis by CPU 12, cadence timing can be determined. Timer 38 continues counting from 250 milliseconds forward until the next line energy detection output 30 indication is presented, indicating the interruption of signal energy on telephone line 11. The count of timer 38, represented on output lines Q1 through Q6, will be decoded at this next energy detection and loaded in registers 36a and 36d. The presented data represents the cadence between pulses occurring in a ringing signal, busy signal and fast busy signal detected on telephone line 11. The dial tone indication is noted, when timer 38 has counted between 2.18 and 3.13 seconds. When this time is presented at the output of timer 38, on Q1 through Q6, and the line energy detector output has not fallen DIALTONE is present. Register stages 36a-36d are loaded to indicate a steady DIALTONE condition with no cadence on telephone line 11. Additionally, an IRQ signal is posted, thus indicating cadence timing information is ready for the CPU. Timer 38 under all cadence conditions will reach a full count and cease counting. Upon a reset of the CPCTL signal, the call progress mode will be restarted. In the event that no energy is present on the line, under a dead line condition, the ED LATCH is never set, as never having detected the signal energy. Thus, timer 38, having not been reset, reaches its full count of 3.13 to 3.81 seconds, the NO LATCH condition detected by decoding of PLA 34 will be entered as a binary code in register stages 36a through 36d. The IRQ is posted at the end of the cycle permitting the DEADLINE condition to be dumped onto bus 18 when CPU 12 initiates a CPSEL command. The call progress mode can be restarted by a reset of the CPCTL signal.

When the mode change to ANSWERTONE is effected, the timer 38 will begin timing when the CPL signal is in a logic 1 state. The decoder 45 will generate clock pulses for the filter 20 which covers the ANSWERTONE frequency of interest as well as select the ANSWERTONE BANDWIDTH of filter 21. Each time a ANSWERTONE is detected during slewing of filter 20, these indications will be entered in output register 36. Output register 36 will post an IRQ signal when timer 38 has reached the 250 millisecond timing position and timer 38 ceases counting. The CPU 12 may then initiate a CPSEL signal for dumping the contents of register stages 36a-36d on the 8 bit bus 18.

Thus, there has been described with respect to one embodiment, a call progress monitor which will permit monitoring the telephone line signal conditions before connecting a communicating computer to the telephone line. Additionally, ANSWERTONEs present on the line will be detected and identified by the call progress monitor under control of the CPU. Those skilled in the art will recognize yet other embodiments of the invention described by the claims which follow.

What is claimed is:

1. In a computer telephone interface system, a call progress monitor comprising:
  an energy detector connected to a telephone line to receive signals from said telephone line;
  a bandpass filter connected to said telephone line, having a selectable center frequency, said bandpass filter having a control input for selecting one of a plurality of bandpass center frequencies;
  a counter-timer connected to a clock pulse source to count clock pulses, said counter-timer having a reset input connected to said energy detector whereby timing counting commences in response to the presence of a signal on said telephone line as detected by said energy detector;
  center frequency control means connected between said counter-timer and the control input of said bandpass filter, said control means changing the frequency passed by said bandpass filter in synchronism with the counting of said counter-timer during a first frequency measuring portion of the period counted by said counter-timer;
  a signal detector connected to said filter for indicating the presence of a signal passing through said filter;
  a data register; and,
  decoding means connected to said counter-timer and said signal detector for generating during said first portion of the period counted by said counter, a binary signal indicating the frequency at which said bandpass filter passes a signal, and for generating during a second cadence measuring portion of said period following said first portion thereof, a binary signal indicating the duration of a cadence interval of signal energy detected by said energy detector, said decoding means sequentially writing said frequency indicating and cadence indicating binary signals into said register.

2. The call progress monitor of claim 1 wherein said center frequency control means comprises:
  a counter connected to said clock pulse source which is a source of high frequency clock pulses;
  a decoder matrix connected parallel outputs of said counter, said decoder matrix including a plurality of decode outputs, one of which is selectable in response to a state of said counter-timer, said outputs connected to a reset input of said counter and to said filter control input, whereby said counter counts a number of high frequency clock pulses depending on which of said decode outputs is selected, and said filter center frequency is selected depending on the pulses produced by said decode outputs.

3. The call progress monitor of claim 1 wherein said data register outputs an interrupt signal to a computer at the end of said first portion of said counting period.

4. The call progress monitor of claim 1 wherein said data register stores an address value output by said counter-timer in response to a signal from said signal detector.

5. In a computer telephone interface system, a call progress monitor comprising:
  an electrical energy detector connected to a telephone line;
  a switched capacitor filter connected to said telephone line, said filter having a plurality of bandpass frequencies, one of which is selectable in response to a clock signal applied to a control input of said filter;
  a signal detector connected to said switched capacitor filter output;
  a timer circuit connected to receive clock pulses;
  filter frequency control means connected between said switched capacitor filter control input and said timer, said control means sequentially selecting each of said bandpass frequencies in response to changes in state of said timer; and
  means connected to receive output signals from said timer, an output signal from said energy detector, and an output signal from said signal detector, said means including a number of register stages and decoder for loading in said register stages a binary number indicating which one of said filter bandpass frequencies passes a signal from said telephone line.

6. The call progress processor of claim 5 further comprising:

means for decoding the count of said timer when said electrical energy detector indicates an interruption of energy on said telephone line;

means for writing into said registers a decoded count value from said means for decoding, said decoded count value representing a cadence measurement of said telephone line detected energy.

7. The call progress processor of claim 6 further comprising means for initiating an interrupt signal to a computer when said registers have received data.

8. The call progress processor of claim 7 further comprising means for reading said data from said registers.

9. In a computer telephone interface system, a call progress monitor comprising:
- an energy detector connected to a telephone line to receive signals from said telephone line;
- a variable frequency bandpass filter having an input of an energy path thereof connected to said telephone line, said filter having a selectable center frequency controlled in response to an electrical signal applied to a control input thereof;
- a filter energy detector connected to an output of said energy path of said filter to indicate the presence of a signal passed by said filter;
- a counter for counting clock pulses from a clock source, said counter being set to count in response to a command from a computer;
- frequency control means coupled to said counter and said control input of said filter for supplying said electrical signal for sequentially changing said bandpass filter center frequency in synchronism with said counter;
- decoding means connected to said counter and said filter energy detector, said decoding means generating a signal at an output thereof identifying a center frequency of said bandpass filter which passes a signal through said energy path of said filter from said telephone line; and
- register means connected to said output of said decoding means for storing said signal identifying said center frequency value at which a signal passes through said energy path of said filter.

10. The call progress monitor of claim 9 further comprising:
- means for outputting an interrupt signal to said computer telephone interface system when said register means stores said identifying signal; and
- means for applying said signal stored in said register means to a common bus of said computer system in response to a command from said computer telephone interface system.

11. The call progress monitor of claim 9 further comprising:
- means for resetting said counter when a first signal is received from said energy detector over a reset connection to said counter;
- means for decoding the value stored in said counter as a time interval when a subsequent signal is received from said energy detector; and
- means operable following said storing of said center frequency value, for storing in said register means cadence data associated with signal energy appearing on said telephone line, said cadence data being accessible by said telephone computer system.

12. The call progress monitor of claim 11 comprising:
- first means connected to said counter for decoding the absence of a counter reset initiated by said energy detector; and
- second means connected to said first means for storing in said register an indication that no reset has occurred indicating a dead line condition.

13. The call progress monitor of claim 11 further comprising means for storing in said register a binary signal indicating the receipt from said telephone line of a dial tone when a subsequent signal from said energy detector is not received within a predetermined time interval.

* * * * *